United States Patent [19]
Doiron

[11] 3,973,351
[45] Aug. 10, 1976

[54] FISHING LURE

[76] Inventor: Joseph G. Doiron, Warwick, Mass. 01378

[22] Filed: Apr. 10, 1975

[21] Appl. No.: 566,801

[52] U.S. Cl. ............................................. 43/42.06
[51] Int. Cl.² ........................................ A01K 85/00
[58] Field of Search .................................. 43/42.06

[56] References Cited
UNITED STATES PATENTS

| | | | |
|---|---|---|---|
| 2,569,465 | 10/1951 | Farr | 43/42.06 |
| 2,659,995 | 11/1953 | Hagstrom | 43/42.06 |
| 3,650,062 | 3/1972 | Troyer | 43/42.06 |

Primary Examiner—Hugh R. Chamblee
Assistant Examiner—Daniel J. Leach
Attorney, Agent, or Firm—Charles R. Fay

[57] ABSTRACT

A fishing lure comprising a relatively heavy tubular member having a bottom surface at the front end thereof at an acute angle with respect to the axis of the tube; and spaced therefrom a similar slanted top surface at the rear of the lure; the terminal end portion at the rear of the lure, including a portion of the slanted top rear surface, being arced downwardly.

1 Claim, 6 Drawing Figures

FISHING LURE

BACKGROUND OF THE INVENTION

There are very many fishing lures all designed with a view towards being attractive to fish so as to encite strikes. One of the functions of some fish lures is to create motion in the water and in some cases there are lures which give a very active motion. The best motion is one which leads the fish to believe that the lure is a smaller fish such as a minnow or smelt and particularly if it acts in an injured manner the larger fish is enticed to strike at it. This fish-like motion is important but the mere fact of creating motion as a flutter, etc., is also important.

SUMMARY OF THE INVENTION

The fish lure comprising the subject matter of this invention is made from a relatively heavy walled tubular material. This material is sliced through at an acute angle to the axis of the tubular material providing an inclination forwardly at the lower surface thereof, the bore through the heavy tubular material thereby providing a long fore and aft elongated oval effect, the top wall of which is the interior surface of the bore of the tubular material. There is a like slice at the top and rear of the lure and this likewise provides a very elongated oval appearance. The two slices overlap each other at the central portion of the lure.

The rear terminal end portion of the lure is relatively thin due to the inclination of the surfaces referred to and this portion of the device is bent down providing a semi-oval wobble tail, and this is provided with a hole for the attachment of a hook or hooks.

When this lure is drawn through the water the bottom inclined area tends to move the lure upwardly; the water flows through from front to rear thereby tending to create a disturbance at the rear of the lure; the surface at the top of the lure tends to press the lure downwardly under certain conditions and the terminal bent down tail portion causes the lure to flutter, especially at the rear of the lure.

Therefore it is seen that this lure will have instances of tendency to dive, tendency to rise, a fluttering action, and a free flow water action causing turbulence at the rear portion of the lure. In this way the lure that is the subject matter of the present application not only provides a very active motion in the water depending upon the speed and intermittent action with which it is drawn through the water, but it also has some relationship to the motion of a small fish which is injured.

PREFERRED EMBODIMENT OF THE INVENTION

Figure 1:
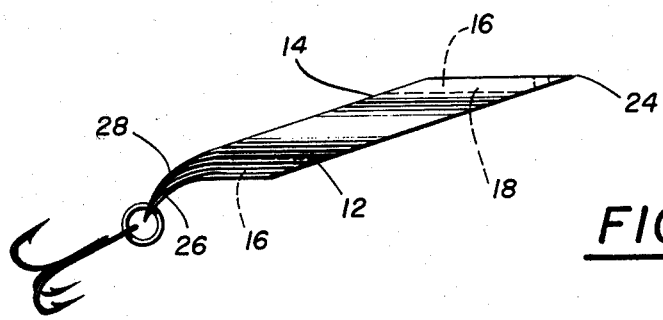
FIG. 1 is a view in side elevation.
Figure 2:
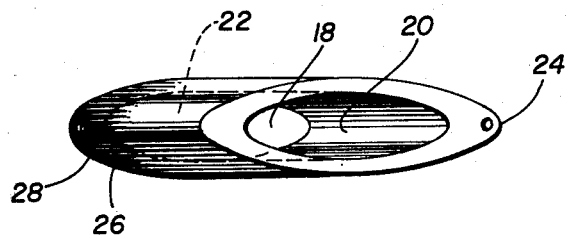
FIG. 2 is a bottom plan view thereof.
Figure 3:
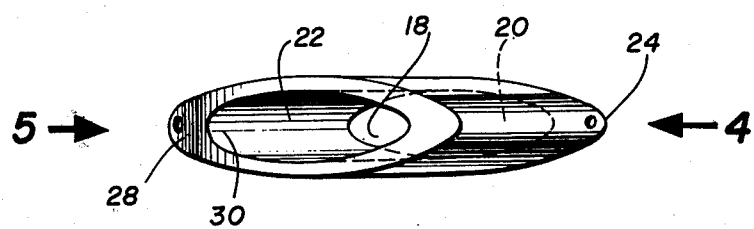
FIG. 3 is a top plan view.
Figure 4:
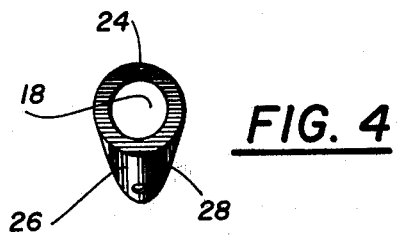
FIG. 4 is a view looking in the direction of arrow 4 in FIG. 3 on an enlarged scale.

The preferred embodiment of the invention resides principally in a section of heavy metal tubing. This tubing is cut as for instance along a line forming a flat surface at 12 and in spaced relation thereto a flat surface at 14. The wall of the tubing is illustrated at 16, 16 and the tubing presents a generally central bore or the like 18.

This construction provides among other things a relatively long top interior surface 20 and a bottom interior surface 22, so that the bore 18 is a great deal longer than the distance between the surfaces 12 and 14. The top and bottom views show that the opposite side walls of the bore overlap in the central portion of the body of the lure.

The forward end of the lure presents a relatively sharp edge 24 which may be apertured for the purpose of attaching the line or leader thereto. The same structure appears at the rear end of the lure but this end is bent down on an arc, see 26 in FIG. 1, providing a wobble tail 28 which is also of reduced thickness and may be apertured for the application of the hook or hooks thereto.

Due to the wall thickness of the original tubing the bait is relatively heavy for its size except for the fact that it is centrally hollow as by bore 18 for passage of water therethrough.

Figure 5:
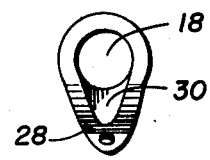
FIG. 5 is a similar view looking in the direction of arrow 5 in FIG. 3.
Figure 6:
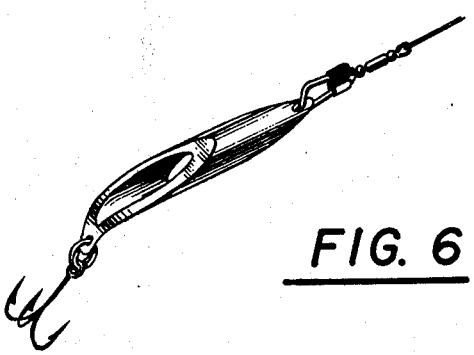
FIG. 6 is a perspective view of the lure.

It will also be noted that the wall 22 of the bore 18 is also depressed at the rear thereof as at 30, see FIG. 5, providing a kind of trough that enhances the action of the water pouring through the bore.

The result of this construction is that the surface 12 provides a relatively inclined plane i.e., relative to the axis of the bore 18 and to the outside surface of the tubular member and this results in a kind of resistance to the forward motion of the lure which causes it to rise to a small extent. At the same time the water relatively moving to the rear through the bore is slightly deflected by the trough 30 as it emerges from the bore. Thus there is water turbulation and a tendency to rise and fall of the lure as it is pulled through the water, especially when the lure is retrieved in a jerky manner.

The downturned portion at 28 is in effect a rear end wobble means so that the lure in addition to tending to rise and sink and making the water turbulent to some extent also wobbles from side to side due to this rear end downturned tail 28. The rear surface at 14 also tends to create a degree of water turbulence.

I claim:
1. A fishing lure comprising a thick walled hollow tubular member of substantially circular cross section having a forward end portion and rear end portion, a slanting flat surface at the front end portion, said surface being at an acute angle with respect to the axis of the hollow tubular member, a slanting surface at the rear end portion of the lure, said surface being parallel to the slanting surface at the front end portion, the front end and the rear end being relatively sharp and the rear end portion extending downwardly below the lower surface of the tubular member, said rear end portion that extends downwardly presenting a smooth downward curve from the rear end of the slanting flat surface at the rear end portion, and a curve from the surface of the tubular member at the rear of the lure to and intersecting the said smooth curve from the rear end portion.

* * * * *